United States Patent [19]
Chen et al.

[11] Patent Number: 5,257,113
[45] Date of Patent: Oct. 26, 1993

[54] VIDEO MIXING TECHNIQUE USING JPEG COMPRESSED DATA

[75] Inventors: Mon-Song Chen, Katonah; Zon-Yin Shae, South Salem, both of N.Y.

[73] Assignee: International Business Machines Corporation, Armonk, N.Y.

[21] Appl. No.: 763,103

[22] Filed: Sep. 20, 1991

[51] Int. Cl.⁵ .................. H04N 1/41; H04N 4/415
[52] U.S. Cl. .................. 358/426; 340/721; 340/721 B; 340/721 C3
[58] Field of Search ............ 358/426, 427, 261.1, 358/261.2, 261.3, 261, 262, 428, 432, 433; 340/721 B, 721 C1, 721 C2, 721 C3

[56] References Cited
U.S. PATENT DOCUMENTS 4,920,426  4/1990  Hatori et al. .............. 358/433
5,126,857  6/1992  Watanabe et al. .......... 358/433

Primary Examiner—Edward L. Coles, Sr.
Assistant Examiner—Jerome Grant, II
Attorney, Agent, or Firm—Douglas W. Cameron

[57] ABSTRACT

An apparatus and method for displaying a plurality of windows on a display screen. With this invention, a stream of image data for each window is divided into coding intervals, and each coding intervals is then compressed and mixed. The mixed compressed data is then decompressed for ultimate display on a display screen.

8 Claims, 5 Drawing Sheets

FIG. 3
OVERLAY TABLE (OT)

| CODING INTERVAL ON DISPLAY SCREEN OR SCREEN POSITION | CODING INTERVAL | |
|---|---|---|
| | SOURCE | RELATIVE POSITION IN WINDOW |
| 1 | | |
| ⋮ | | |
| j | s | m |
| ⋮ | | |
| 2400 | | |

40

FIG. 5
FILTERING TABLE (FT)

| C1 RELATIVE POSITION IN WINDOW | SOURCE | | | | |
|---|---|---|---|---|---|
| | 1 | | i | | N |
| | | | | | |
| | | | | | |
| j | | | x | | |
| | | | | | |
| 2400 | | | | | |

50

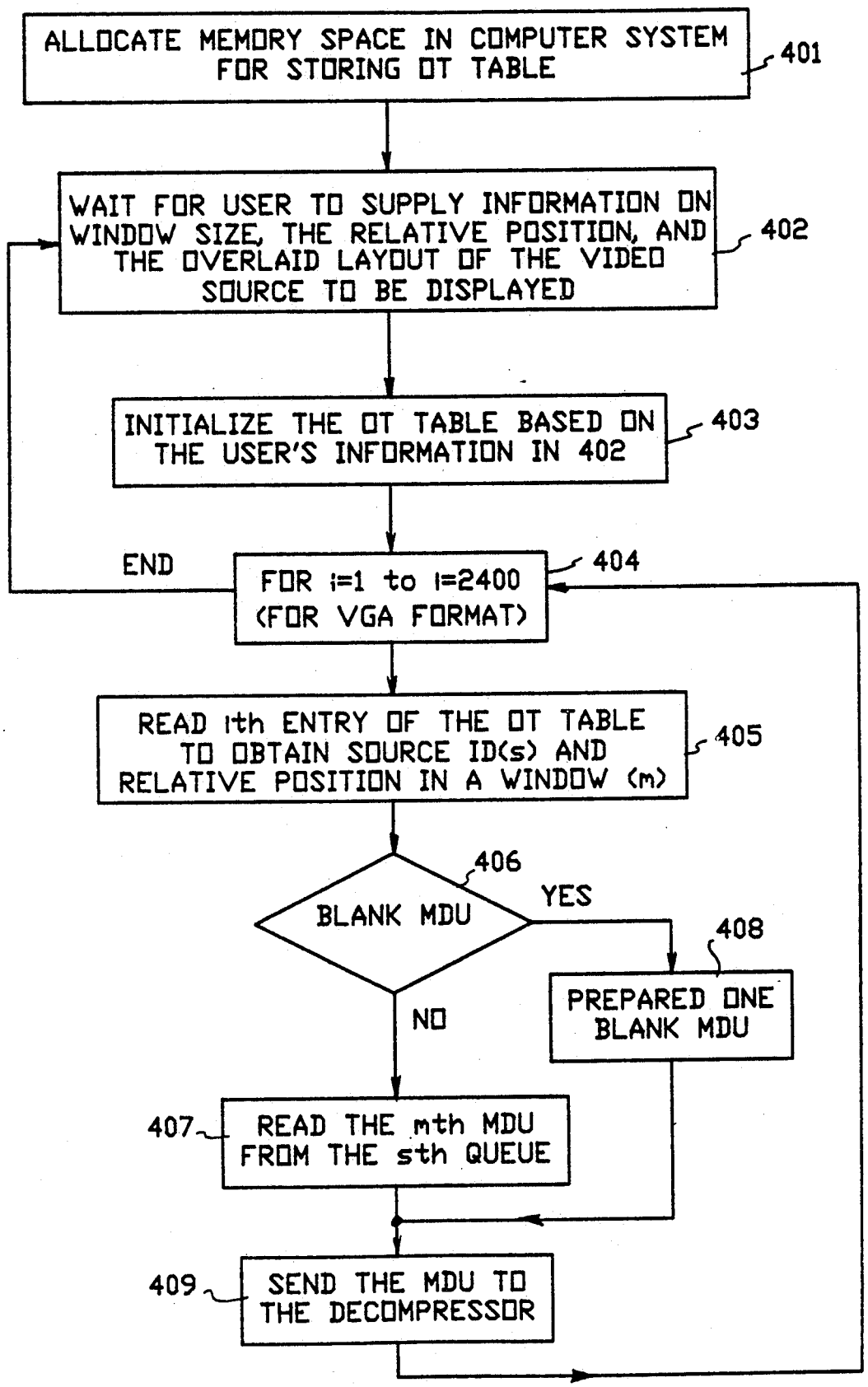

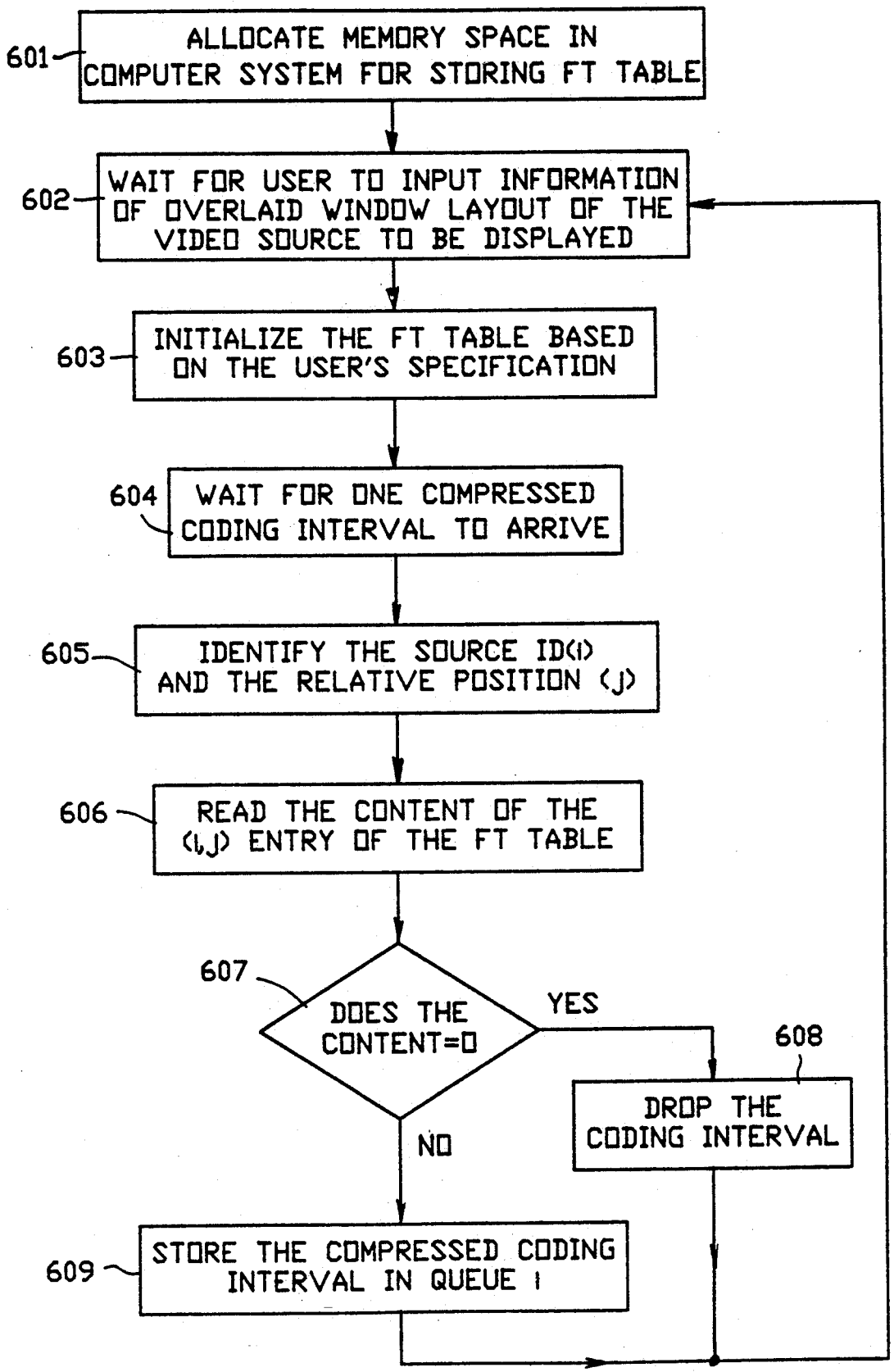

VIDEO MIXING TECHNIQUE USING JPEG COMPRESSED DATA

TECHNICAL FIELD

This invention relates to a multiple window display system. More specifically, this invention relates to a method and apparatus for displaying a plurality of video windows on a display screen wherein the data for the windows are mixed in the compressed data domain.

DESCRIPTION OF THE PRIOR ART

The advances in high speed networking and multimedia technology have made possible a whole new set of multimedia applications. Video processing is one of the major challenges in developing these new applications. In particular, there is often the need to simultaneously receive multiple motion videos from different sources and display them via a set of overlaid video windows. This is referred to as the video mixing or composition.

Videos are generated independently by different sources. They may have different dimensions and formats, such as NTSC (30 Frames/second) and PAL (25 frames/second). For illustrative purposes, it is assumed that the dimension of a video window is the same at the source and the receiver, and is no larger than the dimension of the display screen at the receiver. Let $H_s$ and $V_s$ be the number of pixels in the horizontal and vertical dimensions, respectively, of the display screen, and $H_i$ and $V_i$ be the horizontal and vertical dimensions of video window i. The $H_i \leq H_s$ for $1 \leq i \leq N$.

The approach that is now used is to have one compressed data queue for each video window. When data of a complete video frame is available, they are decompressed by the decoder. The decompressed data or pixels are stored in a pixel queue and are then ready for mixing. A display frame buffer is used as the bitmap of the display screen. To compose and simultaneously display these video windows, pixels are written into the display frame buffer according to [1] the relative position of a pixel in its video window, [2] the position of a video window on the display screen, and [3] the overlay between video windows.

This approach has two major drawbacks. The first one is that it requires a large amount of fast pixel buffers. Typically it is necessary to store pixels of one complete frame for each source before mixing in order to compensate for network variances such as packet loss, corruption, and delay jitter. This means that an amount of buffers for $$\sum_{i=1}^{N} V_i H_i$$

pixels is needed. In the extreme case that each video window is about the size of the display screen, the amount of pixel buffers required would be $NH_sV_s$ pixels. Take the popular VGA, whose dimension is 640 pixel by 480 pixel, as an example, this means 307N thousand pixels. If one pixel is represented by three bytes, then the buffer requirement would be 0.9N megabytes.

If more than one frame is needed to be enqueued for each video window for more sophisticated playback considerations, the buffer requirement would be even larger. In addition, these buffers must be high speed memory because data are to be read out at the full video rate, e.g., 27 Megabytes per second for 30 VGA frames per second.

The second drawback is in the requirement of decompression capacity. Since all compressed data must be decompressed first before pixels can be processed, the receiver needs to decompress $$\sum_{i=1}^{N} V_i H_i$$

pixels. Again this can be as large as $NH_sV_s$ in the extreme case that each video window is about the size of the display screen. This is quite expensive as it would most likely require a bank of decoders running in parallel.

There is, therefore, a need for a multiple window video display system with reduced pixel buffer requirements and decompression capacity.

U.S. Pat. No. 4,890,257 to Anthias et al discloses a technique of maintaining the display ownership of multiple display sources by describing the position and layout of each individual window. This technique, however, teaches mixing or overlaying of multiple windows in a pixel domain. Such an approach is suitable for text or graphic windows, but it is expensive for real time motion video windows.

References

[1] Special issue on "Asynchronous Transfer Mode", Int. J. Digital & Analog Cabled Systems, 1, (4), (1988).

[2] I. Cidon and I. S. Gopal, "PARIS: An Approach to Integrated High-Speed Private Network," Intl. Journal of Digital and Analog Cabled Systems, Vol. 1, pp. 77-85, 1988.

[3] CCITT SGXV, Working Party XV/4, Document #339, March 1988, RM5.

SUMMARY OF THE INVENTION

It is therefore an object of this invention to reduce the number of fast pixel buffers that are needed in a multiple window video display system.

It is a further object of this invention to reduce the requirement for decompression capacity in a multiple window display system.

Accordingly, this invention discloses a method and apparatus for displaying a number of video windows on a display screen. First, this invention provides for dividing a stream of image data into coding intervals where each stream of data corresponds to a video window to be displayed on the screen. Each coding interval has image data for a corresponding portion of one of the windows. Then, each of the coding intervals of image data are compressed, and these compressed coding intervals are now mixed so as to produce a set of compressed data for each corresponding screen position to be displayed. Finally, the mixed compressed data is then decompressed to generate pixel data for the windows to be displayed on the screen.

BRIEF DESCRIPTION OF THE DRAWINGS

FIG. 3 is a schematic illustration of an overlay table used for mixing compressed data.

FIG. 4 is a flow chart for providing the mixing function.

FIG. 5 is a filtering table used in filtering the compressed streams of image data.

FIG. 6 is a flow diagram describing the operation of the filter.

DESCRIPTION OF THE PREFERRED EMBODIMENT

Figure 1:
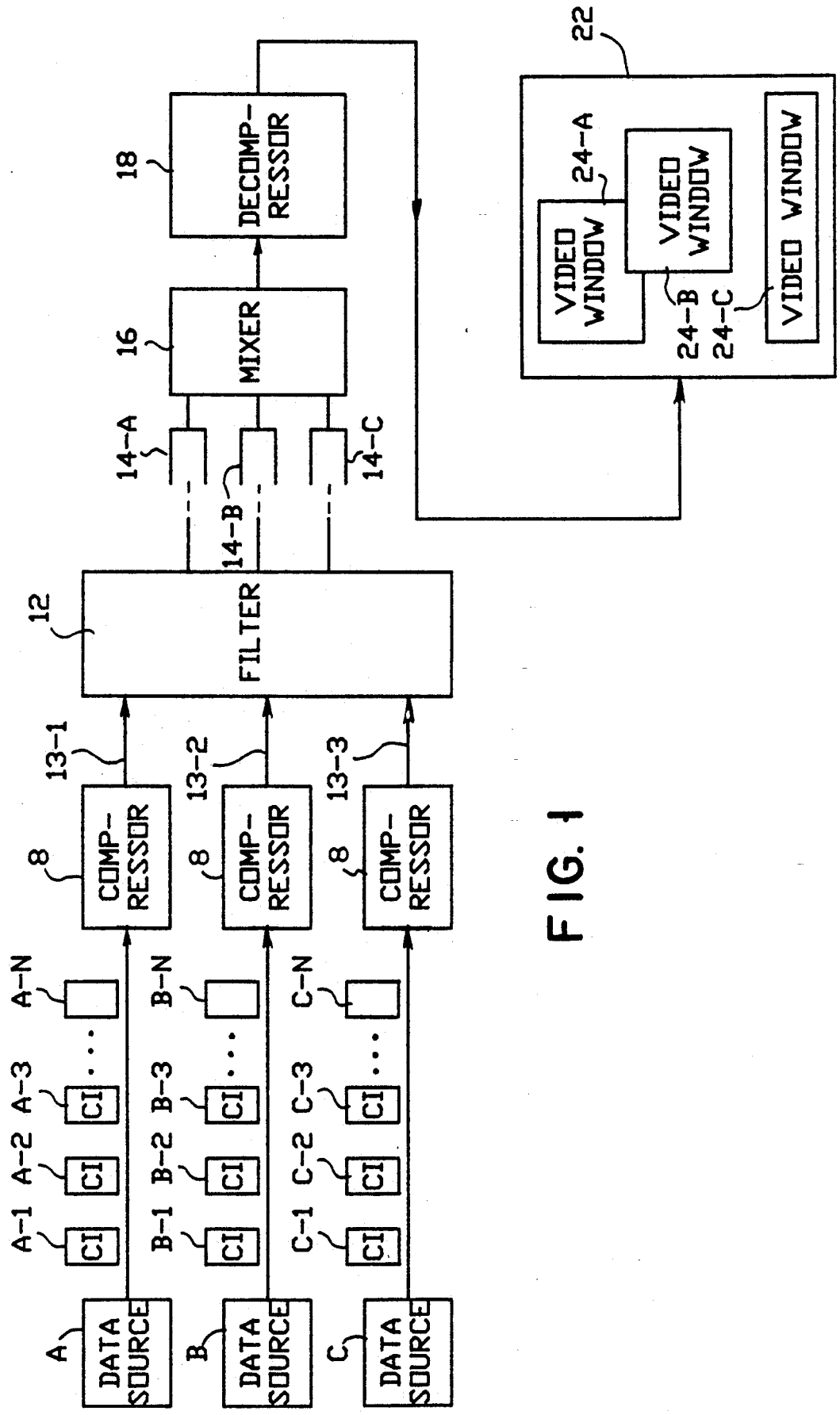
FIG. 1 is a schematic illustration of a system according to the invention.

FIG. 1 is a schematic representation of the method and apparatus of this invention. The image data for video windows 24-A, 24-B and 24-C on display screen 22 are provided from streams of image data generated from data sources A, B and C respectively. Each stream of image data is divided into coding intervals (CI's) such as, for example, A-1 through A-N from data source A. Similarly coding intervals (CI's) B-1 through B-N are obtained by dividing the stream of image data from data source B. Likewise, coding intervals C-1 through C-N are obtained by dividing the data stream from data source C. Each of the coding intervals (CI's) are then individually compressed using a compressor 8. Using the Discrete Cosigne Transform (DCT) and the Joint Photographic Expert Group (JPEG) format to compress the coding intervals into compressed coding intervals. The DCT will generate a set of coefficients for each of the coding intervals. These coefficients are then quantized using Digital Pulse Code Modulation, Run Length coding and the Huffman code. These codes are described in the JPEG standard. To further reduce the need for storing compressed data, filter 12 is used to filter out those coding intervals (CI's) which provide information for the portions of the video windows that are not ultimately displayed. For example, on display screen 22, portions of video window 24-A are not displayed because they are overlapped by corresponding portions of video window 24-B. Also shown are compressed data queues 14-A through 14-C for storing the compressed coding intervals. The compressed data from the queues are then mixed by mixer 16 so as to produce a set of compressed data for each corresponding screen position to be displayed on the display screen. This mixed compressed data is then applied to decompressor 18 to generate the pixel data necessary for displaying the video window on the display screen.

Figure 2:
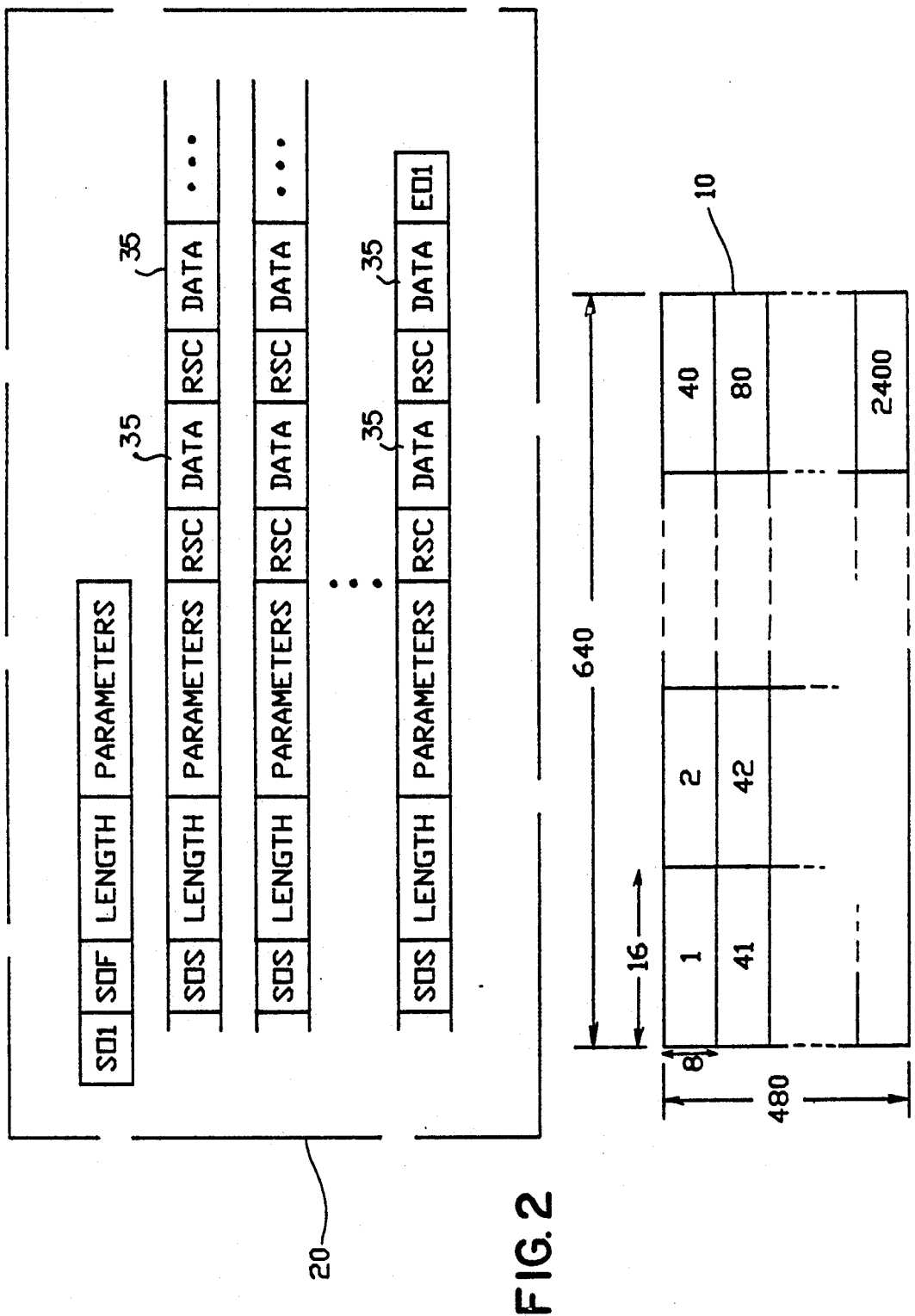
FIG. 2 is a schematic illustration of a typical compressed stream of image data and a displaced 2400 coding intervals.

FIG. 2 schematically illustrates a compressed data stream 20 on any of the output lines 13-1 through 13-3 of compressor 8 of FIG. 1. In JPEG, an image frame can be any size up to 65535 pixels by 65535 pixels. For simplicity and without loss of generality this embodiment will use VGA, which is 640 pixels by 480 pixels, for the display screen. The data stream (for example, a JPEG data stream) also has a set of marker codes, such as SOI, SOF, etc., to delimit itself. The marker codes are embedded observing two byte-aligned 8 bit integers. The byte aligning is designed so that marker codes in a data stream can easily be identified. Several marker codes are important to the new technique and are described below:

SOI (start of image): starts a data stream.
SOF (start of frame): starts a frame.
SOS (start of scan): starts a scan.

A frame consists of several scans. One scan consists of several coding intervals. The size and the essential control parameters of each scan are encoded into the two fields right after SOS, i.e., the sections indicated by the words "length" and "parameters." A coding interval is an integer multiple of the minimum data unit (MDU), which is two consecutive 8 pixel by 8 pixel blocks or a 16 pixel by 8 pixel block. Each section (35) indicated by the words "data" represents a sequence of compressed coding interval data for a corresponding coding interval. These compressed data are then separated by the RSC's as shown.

RSC (resynchronization): terminates the DPCM (Delta Pulse Code Modulation) dependence between DC coefficients (see below).

EOI (end of image): terminates a data stream

FIG. 2 also shows a display screen 10 divided into 2400 coding intervals with each coding interval having 8 by 16 pixels. The coding intervals are numbered from left to right and from top to bottom with each row having 40 coding intervals.

Mixing directly with compressed data is accomplished by using RSC's to delimit and map the coding intervals to blocks of pixels. As stated above, a coding interval can be a small as an MDU, such as a 16 pixel by 8 pixel block. This granularity, when compared to the size of a typical screen, such as VGA, should be fine enough for window overlaying of most applications.

A simple system architecture that can use this new mixing technique is as follows. All sources use the same size coding interval, say a coding interval is an MDU. Each video window is partitioned into a grid of CI's, which are labelled sequentially from left to right and from top to bottom. The position labels of the CI's carried in a packet are encoded in the packet header. In this way, if the receiver knows the dimension of a video window and its coding interval size, it may use the position label to map any coding interval to its corresponding block of pixels.

At the receiver, the display screen is partitioned into a grid of CI's, which are also labelled sequentially from left to right and from top to bottom. For example, if the coding interval is an MDU, then a VGA display screen is partitioned into 2400 coding intervals, as depicted in FIG. 2.

The data structure for mixing multiple JPEG compressed data streams is depicted in FIG. 3 as an overlay table (OT) 40. It is assumed that compressed data and their position labels are stored in separate queues, as shown in 14-A through 14-C of FIG. 1, according to their sources, one queue for each source. It is also assumed that a separate playback module, which is responsible for compensating packet loss, corruption and delay jitter, ensures that the compressed data of a complete frame are waiting in the queues for mixing.

The OT 40 is used to specify the overlay configuration of video windows. This table has one entry for each coding interval on the display screen, as depicted in FIG. 2. For the case of a VGA display, the overlay table has 2400 entries, and each entry maps one coding interval on the display screen to a specific control interval of a specific video window. This information is derived from the user's definition on the positions of the video windows and the overlay configuration of the video windows. A blank coding interval is specified by a special symbol in the source column of the table. For example, if video window 1 has the size of 2 MDU by 2 MDU and is positioned at the upper left corner, namely MDU's 1, 2, 41, and 42 in the VGA display grid. Video window 2 has the size of 3 MDU by 2 MDU and is positioned at the MDU's 42, 43, 44, 82, 83, and 84 in the VGA display grid. The overlapping MDU, i.e., 42, between the two windows is set for video window 1. Then the overlay table has the following entries for these two video windows.

| screen position | coding interval | |
| --- | --- | --- |
| | source | relative position |
| 1 | 1 | 1 |
| 2 | 1 | 2 |
| . | . | . |
| . | . | . |
| . | . | . |
| 41 | 1 | 3 |
| 42 | 1 | 4 | ← overlap
| 43 | 2 | 2 |
| 44 | 2 | 3 |
| . | . | . |
| . | . | . |
| . | . | . |
| 82 | 2 | 4 |
| 83 | 2 | 5 |
| 84 | 2 | 6 |

One composite frame is created every P seconds. To create a composite frame, the mixer goes through every entry in OT and either reads out the specified coding interval (CI) from the queue, or generates a blank coding interval. In addition, the mixer also needs to embed in the new composite compressed data stream the necessary marker codes such as RSC and SOS, quantization table specification, ..., etc., to satisfy the JPEG format. The JPEG decoder then reads in the composite compressed data stream, decompresses it, and outputs the pixels in a form that is suitable for display.

The flow chart of the mixer is shown in FIG. 4. The mixer can be either implemented in software such as PS/2, Apple computer, or in dedicated hardware such as TI, Intel Digital Signal Processors to accelerate the speed.

The system first has to allocate memory space for storing OT Table (401). Then it waits for the user to specify the display layout information from keyboard or file (402). The information needed includes the window size, the window relative position, and the overlaid layout of the video source.

The system then initializes the OT Table (403) based on the user's specifications in 402. Now, the system can start to generate the composite frame by reading the data queue (14-A to 14-C in FIG. 1) in the systematic order based on the OT Table which will be described as follows.

For the VGA format, the OT Table has 2400 entries (404). From i=1 to 2400, the system repeatedly read the ith entry of the OT table to obtain the source ID (s) and its relative position (m). If the source ID (s) indicates a blank MDU (406), then the system prepares a blank MDU (408) and send this blank MDU to the decompressor (409); else, the system reads the mth MDU from the sth queue (see FIG. 1) (407) and send this MDU to the decompressor (409).

The steps from (404) to (409) repeat 2,400 times to generate a complete composite compressed frame for decompression.

The flowchart of the filter is shown in FIG. 6. The filter can be either implemented in software such as PS/2, Apple computer, or in dedicated hardware such as TI, Intel Digital Signal Processors to accelerate the speed.

The system first allocates memory space for storing FT Table (601). Then it waits for the user to specify the overlay layout of the video sources to be display (602). The system then initializes the FT Table (603) based upon the user's specification. For the VGA format, the FT Table has 2400 entries.

Then the system waits for one compressed coding interval to arrive (604). The source ID (i) and the relative position (j) of the incoming compressed coding interval will be obtained (605). The system then reads the (i,j) entry of the FT Table (606). If the content is equal to zero, then drop the compressed coding interval (608). Otherwise, store the compressed coding interval into the queue (i) (609).

The steps from (602) to (608) or (609) will be repeated.

In the previous section, it is assumed that the compressed data of a frame is always awaiting in each queue for mixing. This implies that buffers are needed to hold compressed data for up to $$\sum_{i=1}^{N} V_i H_i$$

pixels. This buffer requirement can be reduced by observing that a CI need not be enqueued if it is covered by another CI of some video window. With appropriate packet filtering, the buffer requirement is reduced to the amount for holding compressed data for a screen full of pixels, regardless of the number of video windows and their dimensions. FIG. 5 illustrates the data structure for packet filtering. A Filtering Table (FT) 50 for each video window is used to guide the filter in discarding or buffering an arriving CI. A FT has one entry for each CI in each video window. For the example of VGA display and the common coding interval size of an MDU, FT has 2400 entries, because each video window can be as large as a VGA screen. Each entry has N flags, one for each source. A flag is set if the corresponding CI will be displayed; otherwise, it is overlaid by other video windows. Therefore, a CI is stored only if its flag is set.

Having thus described our invention, what we claim as new and desire to secure by Letters Patents is:

1. A method of displaying a plurality of video windows, on a display screen, with each video window being generated from a corresponding stream of image data from a unique data source, said method comprising:
    (a) dividing each said stream of image data into coding intervals, each of said coding intervals having image data for a corresponding portion of a corresponding one of said windows, with each window being generated from a unique source;
    (b) compressing each of said coding intervals of image data so as to produce a first set of compressed data for each of said coding intervals;
    (c) mixing each said first set of compressed data generated from multiple sources to generate at least one second set of compressed data for each said corresponding portion to be displayed on said display screen; and
    (d) decompressing each second set of data to generate pixel data for each said corresponding portion to be displayed on said display screen.

2. A method as recited in claim 1, wherein in each of said streams, coding intervals are separated from each other by delimiters.

3. A method as recited in claim 1, wherein compressing each of said coding intervals of image data comprises transforming each of said coding intervals of image data with a discrete cosine transform so as to produce a set of coefficients for each of said coding intervals.

4. A method as recited in claim 1, further comprising:
filtering each said first set of compressed data prior to mixing each said first set of compressed data, each said first set being filtered by using a filtering table for each of said windows, each said filtering table having an entry for each said portion of one of said windows, each said entry indicating from which said stream of image data a corresponding said first set of compressed data is to be decompressed for display on said display screen.

5. A method as recited in claim 1, wherein each said first set of compressed data is mixed by using a overlay table having an entry for each screen position displayed on said screen, with each said entry indicating which coding interval of said coding intervals and which stream of said streams is to be decompressed for a corresponding screen position.

6. An apparatus for displaying a plurality of video windows on a display screen, with each video window being generated from a corresponding stream of image data from a unique data source, said apparatus comprising:
(a) means for dividing each said stream of image data into coding intervals, each of said coding intervals having image data for a corresponding portion of a corresponding one of said windows, with each window being generated from a unique source;
(b) means for corresponding each of said coding intervals of image data so as to produce a first set of compressed data for each of said coding intervals;
(c) means for mixing each said first set of compressed data to generated at least one second set of compressed data generated from multiple sources for each said corresponding portion to be displayed on said display screen; and
(d) means for decompressing each second set of data to generate pixel data for each said corresponding portion to be displayed on said display screen.

7. A method of displaying a plurality of video windows, on a display screen, with each video window being generated from a corresponding stream of image data from a unique data source, said method comprising:
(a) dividing each said stream of image data into coding intervals, each of said coding intervals having image data for a corresponding portion of a corresponding one of said windows, with each window being generated from a unique source;
(b) compressing each of said coding intervals of image data so as to produce a first set of compressed data for each of said coding intervals;
(c) filtering each said first set of compressed data prior to mixing each said first set of compressed data, each said first set being filtered by using a filtering table for each of said portion of one of said windows, each said entry indicating from which said stream of image data a corresponding said first set of compressed data is to be decompressed for display on said display screen;
(d) mixing each said first set of compressed data generated from multiple sources to generated at least one second set of compressed data for each said corresponding portion to be displayed on said display screen; and
(e) decompressing each second set of data to generated pixel data for each said corresponding portion to be displayed on said display screen.

8. A method as recited in claim 7, wherein each said first set of compressed data is mixed by using a overlay table having an entry for each screen position displayed on said screen, with each said entry indicating which coding interval of said coding intervals and which stream of said streams is to be decompressed for a corresponding screen position.

* * * * *